(12) United States Patent
Jiang et al.

(10) Patent No.: US 8,999,584 B2
(45) Date of Patent: Apr. 7, 2015

(54) METHOD FOR PRE-LITHIATION OF THE NEGATIVE ELECTRODE IN LITHIUM ION BATTERIES

(71) Applicant: GM Global Technology Operations LLC, Detroit, MI (US)

(72) Inventors: Meng Jiang, Rochester, MI (US); Xingcheng Xiao, Troy, MI (US); Mei Cai, Bloomfield Hills, MI (US); Li Yang, Troy, MI (US); Bob R. Powell, Jr., Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 13/832,297

(22) Filed: Mar. 15, 2013

(65) Prior Publication Data

US 2014/0272584 A1    Sep. 18, 2014

(51) Int. Cl.
| | |
|---|---|
| *H01M 2/14* | (2006.01) |
| *H01M 4/04* | (2006.01) |
| *H01M 4/40* | (2006.01) |
| *H01M 4/48* | (2010.01) |
| *H01M 4/50* | (2010.01) |
| *H01M 4/52* | (2010.01) |
| *H01M 4/58* | (2010.01) |

(52) U.S. Cl.
CPC ............... *H01M 4/58* (2013.01); *H01M 2/145* (2013.01); *H01M 4/0404* (2013.01)

(58) Field of Classification Search
USPC ......... 429/220, 231.95, 223, 224, 221, 231.3, 429/222, 623.1, 623.5; 427/126.3
See application file for complete search history.

(56) References Cited

U.S. PATENT DOCUMENTS

| | | | |
|---|---|---|---|
| 2005/0244715 A1* | 11/2005 | Cho et al. ................... | 429/246 |
| 2005/0260495 A1* | 11/2005 | Onnerud et al. ........... | 429/231.1 |
| 2007/0190408 A1* | 8/2007 | Inoue et al. ................ | 429/145 |

FOREIGN PATENT DOCUMENTS

JP         09102313 A    *    4/1997    .............. H01M 4/58

OTHER PUBLICATIONS

"Synthesis and electrochemical studies of a new anode material, Li3-xCoxN", Nishijima et al., Solid State Ionics 83 (1996), p. 107-111.*
"Lithium secondary batteries using a lithium cobalt nitride, Li2.6Co0.4N, as the anode", Takeda et al., Solid State Ionics 130 (2000), p. 61-69.*
Machine Translation of: Masashiro et al., JP 09/102313A, Apr. 15, 1997.*
"Synthesis and ionic conductivity of CuxLi3-xN", Asai et al., Material Research Bulletin, vol. 19, Issue 10, p. 1377-1381, Oct. 1984.*

* cited by examiner

*Primary Examiner* — Kenneth Douyette
(74) *Attorney, Agent, or Firm* — Fraser Clemens Martin & Miller LLC; William A. Ziehler

(57) ABSTRACT

A Li-ion battery is disclosed, the Li-ion battery including an anode, a cathode, a lithium donor formed from a Li-containing material, and an electrolyte in communication with the anode, the cathode, and the lithium donor. The lithium donor may be incorporated into the anode, incorporated into the cathode, a layer formed on either an anode side or a cathode side of a separator of the battery. The lithium donor is formed from Li-containing material insensitive to oxygen and aqueous moisture.

16 Claims, 2 Drawing Sheets

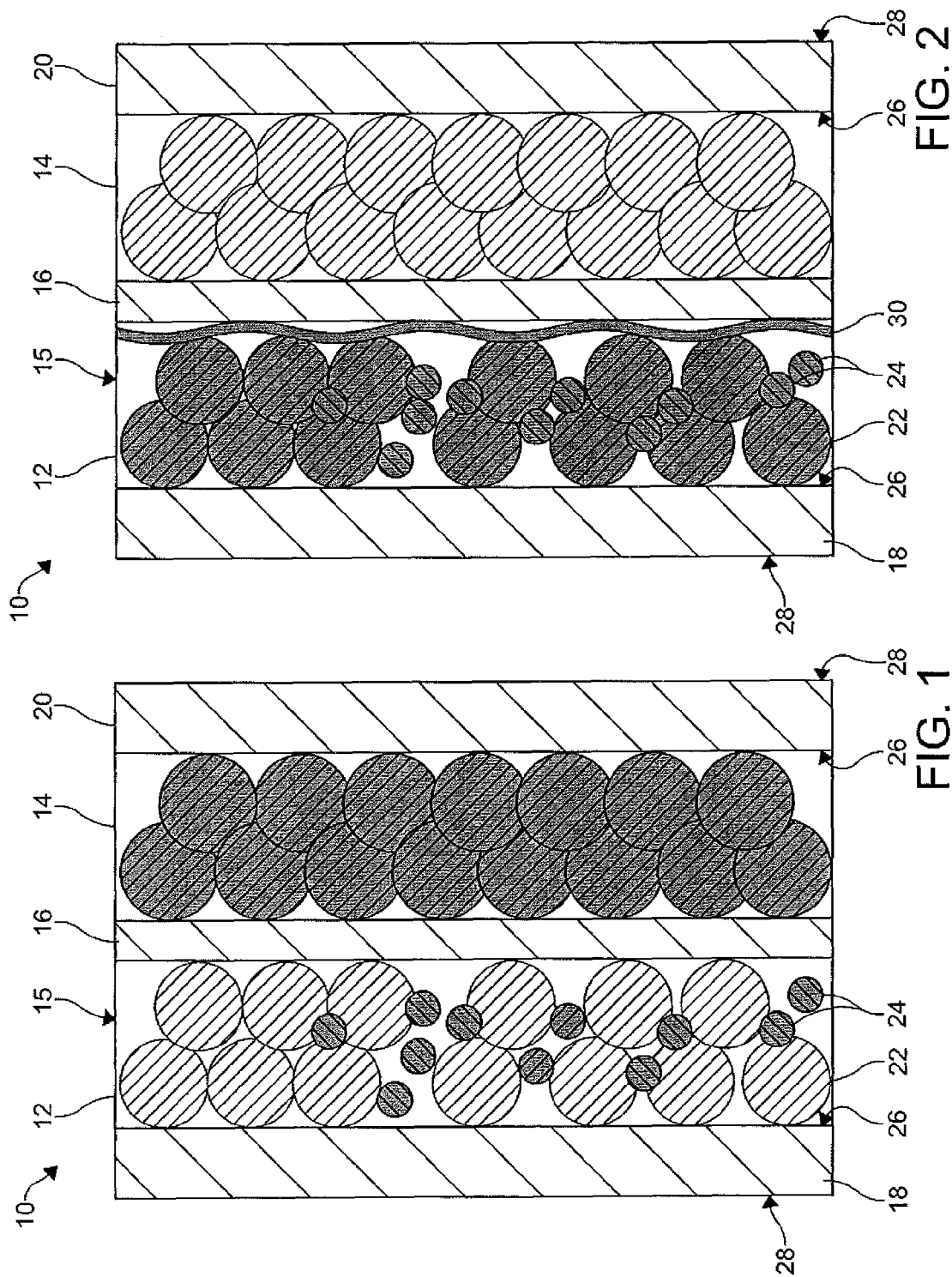

METHOD FOR PRE-LITHIATION OF THE NEGATIVE ELECTRODE IN LITHIUM ION BATTERIES

FIELD OF THE INVENTION

The present disclosure relates to a rechargeable battery, and more particularly to a lithium-ion battery having a lithium donor.

BACKGROUND OF THE DISCLOSURE

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles, cellular phones, and other electronic devices. For example, the battery cell may be prismatic in shape to facilitate a stacking of the battery cells. A plurality of individual battery cells can be provided in a battery pack to provide an amount of power sufficient to operate electric vehicles.

Nartostructured negative electrodes of lithium-ion batteries have a large surface area resulting in a high irreversible capacity loss (IRCL) due to the formation of a solid electrode interface (SEI). To compensate for Lithium loss in an SEI, extra capacity may be packed onto the positive electrode of the battery. However, this approach reduces the energy density of the battery and potentially leads to an undesirable lithium plating on the negative electrode.

To provide more lithium ions (hereinafter Li) to compensate for an SEI (or another lithium-consuming mechanism), additional or supplementary Li may be provided by pre-lithiation of a component of the battery. One method of pre-lithiation includes providing a Li foil on or adjacent an electrode or separator of the battery. Pre-lithiation may also be achieved by spraying stabilized Li particles onto electrodes of the battery. Due to particle size mismatch between Li particles and typical electrode materials, voids of uncoated electrode may exist, thereby leading to non-homogeneity of the electrode, which is disadvantageous for battery performance. Furthermore, thermal energy is formed during this pre-lithiation process, which increases a complexity and a cost of the battery during mass production. Specifically, the spray process requires dry ambient conditions due to the sensitivity of Li to water and oxygen.

Another pre-lithiation method includes applying a thin coat of Li on a separator of the battery by thermal evaporation or a sputtering process. Mass production of a battery having a separator pre-lithiated using either of these techniques is not cost effective, thereby increasing a cost of the battery. Furthermore, these processes also generate a large amount of thermal energy due to the direct contact between Li metal and an electrode, especially in large cells of the battery. Yet another method of pre-lithiation includes pre-lithiation of an electrode by electrochemical deposition. Mass production of a battery having an electrode pre-lithiated using electrochemical deposition is not cost effective due to the use of excessive amounts of electrolyte required, thereby increasing a cost of the battery.

There is a continuing need for a cost-effective lithium-ion battery suitable for mass production having improved energy density, coulombic efficiency, and abuse tolerance which result in an extended life cycle.

SUMMARY OF THE INVENTION

In concordant and congruous with the present invention, a cost-effective lithium-ion battery suitable for mass production having improved energy density, coulombic efficiency, and abuse tolerance which result in an extended life cycle has surprisingly been discovered.

In an embodiment of the invention, a Li-ion battery comprises an anode; a cathode; a lithium donor formed from a Li-containing material; and an electrolyte in communication with the anode, the cathode, and the pre-lithiated donor.

In another embodiment of the invention, a Li-ion battery comprises an anode; a cathode; a separator for separating the anode and the cathode; a lithium donor formed from a Li-containing material, wherein the lithium donor is one of incorporated in the anode, incorporated in the cathode, a layer formed on the separator adjacent the anode, and a layer formed on the separator adjacent the cathode; and an electrolyte in communication with the anode, the cathode, and the lithium donor.

In another embodiment of the invention, A method of forming a Li-ion battery comprises the steps of mixing a powdered Li-containing material with a non-aqueous liquid to form a slurry, the lithium donor formed from one of a compound having a formula of $Li_{3-x}M_xN$ (where M is one of Co, Cu, and Ni and where x is from about 0.01 to about 0.6), $Li_{2x-1}MN_x$ (where M is one of Mn, Fe, and V and where x is from about 1 to about 4), and $Li_xMVO_4$ (where M is one of Zn, Co, Ni, or Cd and where x is from about 1 to about 8); coating the slurry on one of a current collector and a side of a separator of a Li-ion battery; and drying the slurry coated on one of the current collector and the side of the separator to form a lithium donor.

DRAWINGS

The above, as well as other advantages of the present disclosure, will become readily apparent to those skilled in the art from the following detailed description, particularly when considered in the light of the drawings described herein.

FIG. 1 is a schematic diagram of an assembled Li-ion battery according to an embodiment of the invention;

FIG. 2 is a schematic diagram of the assembled Li-ion battery of FIG. 1 after a first charging operation thereof;

DETAILED DESCRIPTION OF THE INVENTION

Figure 4:
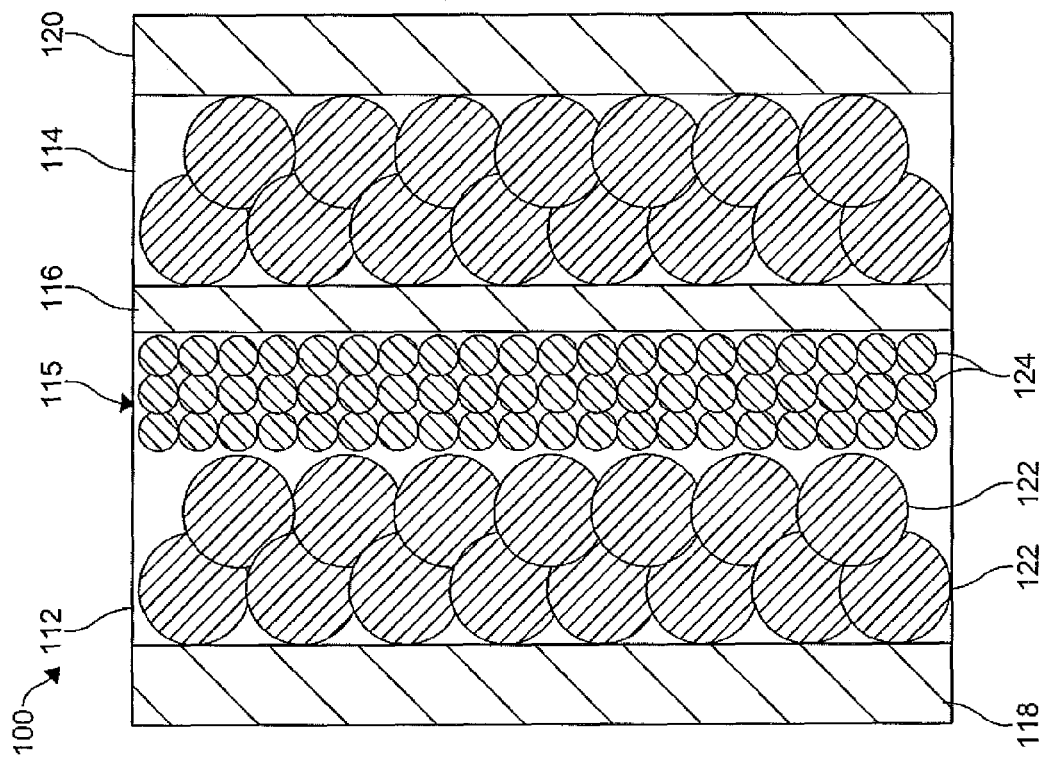
FIG. 4 is a schematic diagram of a Li-ion battery according to an embodiment of the invention.

The following detailed description and appended drawing describes and illustrates an embodiment of the invention. The description and the drawing serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 3:
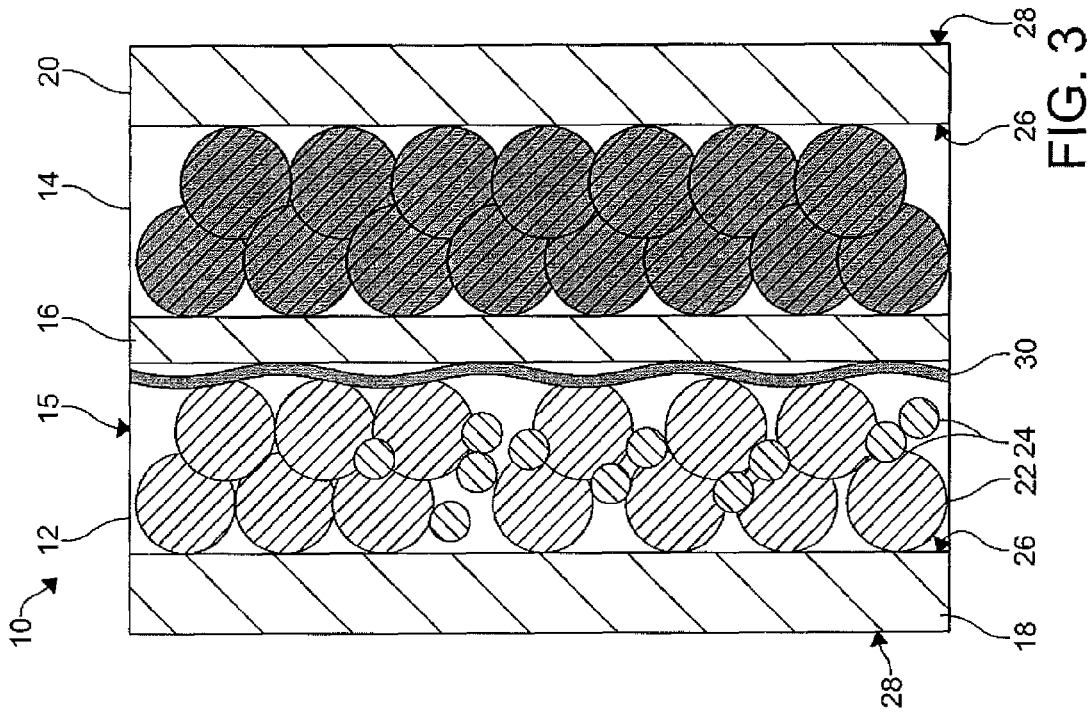
FIG. 3 is a schematic diagram of the assembled Li-ion battery of FIG. 2 after a first discharging operation thereof.

FIGS. 1-3 illustrate a lithium-ion battery 10 according to an embodiment of the invention. The battery 10 includes a negative electrode or anode 12, a positive electrode or cathode 14, a lithium donor 15, and a separator 16 for separating the anode 12 from the cathode 14. The separator 16 is formed from a porous material soaked with liquid or gel electrolyte in electrochemical communication with the anode 12 and the cathode 14. The separator 16 may be formed from polyethylene, polypropylene, or polvinylidene fluoride (PVFD), for example. The battery 10 also includes a current collector 18 in electrical communication with the anode 12 and a current collector 20 in electrical communication with the cathode 14. The collector plates 18, 20 are formed from an electrically conductive material, such as a Cu foil or another metal, for example, and the current collectors 18, 20 are electrically conductive substrates each having a first side 26 and a second side 28. As shown in FIGS. 1-3, the current collector 18 is abutting the anode 12 and the current collector 20 is abutting the cathode 20. The current collectors 18, 20 are in electrical communication via an external circuit (not shown).

As shown in FIGS. 1-3, the anode 12 is formed from a mixture of an anode active material 22 and a Li-containing material 24. Accordingly, the anode 12 has the lithium donor 15 incorporated therein. The anode active material 22 is a material with a large surface area and high irreversible capacity loss, such as: (a) Carbon, meso-phase carbon, soft carbon, hard carbon, carbon black, activated carbon, natural graphite, artificial graphite, pyrolytic graphite, exfoliated graphite flakes, graphite worm, carbon nano-fiber, carbon nanotube, graphene, graphene oxide, graphene fluoride, carbon fiber, graphite fiber, graphite whisker, and coke; (b) Silicon (Si), germanium (Ge), tin (Sn), lead (Pb), antimony (Sb), bismuth (Bi), zinc (Zn), aluminum (Al), and cadmium (Cd); (c) Alloys or intermetallic compounds of Si, Ge, Sn, Pb, Sb, Bi, Zn, Al, Ti, Fe, Mn, or Cd with other elements, wherein said alloys or compounds are stoichiometric or non-stoichiometric; (d) Oxides, carbides, nitrides, sulfides, phosphides, selenides, and tellurides of Si, Ge, Sn, Pb, Sb, Bi, Zn, Al, Fe, Ti, Mn, Co, or Cd, and their mixtures or composites; and (e) combinations thereof, for example.

The Li-containing material 24 of the anode 12 is a material that is resistant to the effects of oxygen and aqueous moisture. One suitable Li-containing material 24 is indicated by the formula $Li_{3-x}M_xN$, where M is one of Co, Cu, and Ni and where x is from about 0.01 to about 0.6. Where M is Co, positive results have been obtained when x is from about 0.01 to about 0.5. Where M is Cu, positive results have been obtained when x is from about 0.01 to about 0.3. Where M is Ni, positive results have been obtained when x is from about 0.01 to about 0.6. As one non-limiting example of positive results obtained from the Li-containing material 24 being $Li_{2.6}Co_{0.4}N$, the battery 10 can deliver 760 mAh/g during a cycle of the battery when delithiation occurs, and 1024 mAh/g in subsequent cycles thereof. Furthermore, $Li_{2.6}Co_{0.4}N$ shows a favorable rate capability of 1C/0.2C (or 94.94%) as compared to graphite which typically has a rate capability of 82-88%.

Another suitable Li-containing material 24 is indicated by the formula $Li_{2x-1}MN_x$, where M is one of Mn, Fe, and V and where x is from about 1 to about 4. Where M is Mn, positive results have been obtained when x is about 4. Where M is Fe, positive results have been obtained when x is about 2. Where M is V, positive results have been obtained when x is about 1. Another suitable Li-containing material 24 is indicated by the formula is $Li_xMVO_4$ where M is Zn, Co, Ni, or Cd and where x is from about 1 to about 8.

The cathode 14 is formed from a cathode material such as a non-lithiated $V_2O_5$ or $MnO_2$, or a lithiated species (e.g., lithium iron phosphate, lithium cobalt oxide particles, or $Li_4SiO_4$), NMC, $LiMNO_4$, a graphene-based material (e.g., graphene, graphene oxide, or graphene fluoride sheets having high specific surface areas to capture lithium ions during cell discharge), and a carbonaceous material having a high specific surface area. The graphene-based material and/or the carbonaceous material may also be incorporated with another material to act as a conductive additive, as desired. It is understood that the lithium donor 15 may be incorporated into the cathode 14 in a manner similar to the embodiment described herein where the lithium donor 15 is incorporated into the anode 12. Specifically, the cathode 14 may be formed by coating a slurry including the lithium donor 15 on one or more of the sides 26, 28 of the cathode 14.

Prior to assembly of the battery 10, the anode 12 is formed according to an embodiment of the invention. The anode 12 is formed by mixing the Li-containing material 24 in a powdered form with the anode active material 22 in a powdered form. The powders are mixed into a slurry with a non-aqueous liquid. The non-aqueous liquid may be NMP(N-Methyl-2-pyrrolidone), acetone, and the like, for example. Because the Li-containing material 24 is not pure Li or a Li foil, there is no direct contact between Li metal and the anode active material 22, and thermal energy generated during the slurrying process is minimized. The slurry may also include a binder or other additives (not shown). Another benefit of using the Li-containing material 24 as described herein is that the particle size thereof may be optimized during chemical synthesis of the material 24 or may be mechanically comminuted (e.g., from particle sizes on a μm scale to a nm scale, for example) to match a particle size of the anode active material 22, as desired. The slurry material is coated on the first side 26 of the current collector 18 and dried to form the anode 12 thereon. It is understood that the slurry may be coated on the second side 28 of the current collector 18, or both of the sides 26, 28 thereof, as desired. By forming the anode 12 according to this method, the anode 12 is pre-lithiated. The anode 12 includes the Li-containing material 24 admixed with the anode active material 22.

FIGS. 1-3 are representative of components of the battery 10 having Li ions thereon/therein during various steps of a cycle of use thereof: after assembly (FIG. 1), after a first charging operation (FIG. 2), and after a first discharging operation (FIG. 3). Li ions are shown by the shading of the components having Li ions therein/thereon.

A fully-assembled battery 10 is shown in FIG. 1. The fully-assembled battery 10 includes the anode 12 and the collector plate 18 disposed on one side of the separator 16 and the cathode 14 and the collector plate 20 on the other side of the separator 16, as shown in FIGS. 1-3. The assembled battery 10 is disposed in a casing (not show). The anode 12 is disposed between the separator 16 and the current collector 18, and the cathode 14 is disposed between the separator 16 and the current collector 20. Li ions in the fully-assembled battery 10 are on the Li-containing material 24 and the cathode 14, as indicated by the shading of FIG. 1.

Once the battery 10 is assembled, the battery 10 is charged in a charging operation by an outside source of power. FIG. 2 shows the battery 10 in a fully-charged state with a solid electrolyte interface (SEI 30), the Li-containing material 24, and the anode 12 having Li ions therein/thereon. The SEI 30, the Li-containing material 24, and the anode 12 are therefore shown as shaded in FIG. 2.

As the battery 10 is charged for the first time, Li ions are extracted from the cathode 14 and introduced into the anode 12. As a result, the decomposition product known as the SEI 30 forms on the surface of the anode 12. The SEI 30 comprises Li and electrolyte components. The SEI 30 establishes an ionic connection between the anode 12 and the electrolyte. Accordingly, formation of the SEI 30 is necessary. However, as the SEI 30 is formed, a portion of the Li introduced into the cells via the cathode 14 is irreversibly bound to the SEI 30 and no longer participates in the cyclic operation of the battery 10. Thus, the Li-containing material 24 provides the additional Li to compensate for Li lost to the SEI 30, in addition to providing enough Li ions to intercalate into the cathode 14 during a discharging operation of the battery 10. By providing the Li-containing material 24 in the lithium donor 15 such as the pre-lithiated anode 12 of FIGS. 1-3, irreversible capacity loss of the battery 10 is minimized and a capacity retention thereof is maximized. Accordingly, the coulombic efficiency of the battery 10 is also maximized. Additionally, using the Li-containing material 24 instead of a pure Li or a Li foil also militates against an undesirable formation of lithium dendrites during operation of the battery 10, thereby improving an abuse tolerance of the battery 10. If the battery 10 is used in a vehicle (not shown), the battery 10 has increased energy density, thereby extending a driving range of the vehicle. Furthermore, by including a Li-containing component on the anode side of the battery 10, packing extra Li capacity in the cathode, as known in the art, is not required, and lithium plating of components, such as the anode 12, is militated against. FIG. 3 shows the battery 10 in a fully-discharged state. During discharge, the Li ions migrate from the anode 12, across the separator 16, and to the cathode 14. Accordingly, FIG. 3 shows the cathode 14 and the SEI 30 having Li ions therein/thereon, and the cathode 14 and the SEI 30 are therefore shown as shaded in FIG. 3. With the exception of the formation of the SEI 30, further cycles of the battery 10 are similar to the first cycle described herein.

FIG. 4 shows a battery 110 according to another embodiment of the invention. The embodiment of FIG. 4 is similar to the battery 10 of FIGS. 1-3 except as described below. Like the structure from FIGS. 1-3, FIG. 4 includes reference numerals in the 100s instead of the 10s, with the remaining two digits the same.

In the embodiment shown, a slurry material is formed from a Li-containing material 124 and a non-aqueous liquid. The slurry is coated on a separator 116 on a side thereof adjacent the anode 112 and dried, thereby forming a layer that is a lithium donor 115. Alternatively, the slurry may be coated on the separator 116 on a side thereof adjacent the cathode 114 and dried, thereby forming a layer that is the lithium donor 115. The anode 112 is formed from a material with a large surface area and high irreversible capacity loss, such as: (a) carbon, meso-phase carbon, soft carbon, hard carbon, carbon black, activated carbon, natural graphite, artificial graphite, pyrolytic graphite, exfoliated graphite flakes, graphite worm, carbon nano-fiber, carbon nanotube, graphene, graphene oxide, graphene fluoride, carbon fiber, graphite fiber, graphite whisker, and coke; (b) silicon (Si), germanium (Ge), tin (Sn), lead (Pb), antimony (Sb), bismuth (Bi), zinc (Zn), aluminum (Al), and cadmium (Cd); (c) alloys or intermetallic compounds of Si, Ge, Sn, Pb, Sb, Bi, Zn, Al, Ti, Fe, Mn, or Cd with other elements, wherein said alloys or compounds are stoichiometric or non-stoichiometric; (d) oxides, carbides, nitrides, sulfides, phosphides, selenides, and tellurides of Si, Ge, Sn, Pb, Sb, Bi, Zn, Al, Fe, Ti, Mn, Co, or Cd, and their mixtures or composites; and (e) combinations thereof, for example.

Once the lithium donor 115 is formed, the battery 110 is fully assembled in a casing (not shown). The fully-assembled battery 110 includes the anode 112 and a collector plate 118 disposed on one side of the separator 116 and the cathode 114 and the collector plate 120 on the other side of the separator 116, as shown in FIG. 4. The assembled battery 110 is disposed in a casing (not shown). The anode 112 is disposed between the separator 116 and the current collector 118, and the cathode 114 is disposed between the separator 116 and the current collector 120. Operation of the battery 110 is substantially similar to that described above with respect to the battery 10.

As the fully-assembled battery 110 is charged for the first time, Li ions are extracted from the cathode 114 and introduced into the anode 112. As a result, the decomposition product known as the SEI forms on the surface of the anode 112 establishing an ionic connection between the anode 112 and an electrolyte of the battery 110. The Li-containing material 124 provides the additional Li to compensate for Li lost to the SEI, in addition to providing enough Li ions to intercalate into the cathode 114 during a discharging operation of the battery 110. By providing the Li-containing material 124 in the lithium donor 115 formed on the separator 116, irreversible capacity loss of the battery 110 is minimized and a capacity retention thereof is maximized. Accordingly, the coulombic efficiency of the battery 110 is also maximized. Additionally, using the Li-containing material 124 instead of a pure Li or a Li foil also militates against an undesirable formation of lithium dendrites during operation of the battery 110, thereby improving an abuse tolerance of the battery 110. If the battery 110 is used in a vehicle (not shown), the battery 110 has increased energy density, thereby extending a driving range of the vehicle. Furthermore, by including a Li-containing component on the anode side of the battery 110, packing extra Li capacity on a cathode side thereof is not required, and lithium plating of components, such as the anode 112, is militated against. During discharge, the Li ions migrate from the anode 112, across the separator 116, and to the cathode 114. Accordingly, with the exception of the formation of the SEI, further cycles of the battery 110 are similar to the first cycle described herein.

It is understood that a further embodiment of the invention may include a combination of the features of the embodiment shown in FIGS. 1-3 and the embodiment of FIG. 4.

While certain representative embodiments and details have been shown for purposes of illustrating the invention, it will be apparent to those skilled in the art that various changes may be made without departing from the scope of the disclosure, which is further described in the following appended claims.

What is claimed is:

1. A Li-ion battery comprising:
   an anode;
   a cathode;
   a separator for separating the anode and the cathode;
   a lithium donor formed from a Li-containing material wherein the lithium donor is a layer formed on a side of the separator adjacent one of the anode and the cathode, the Li-containing material including one of:
   a compound having a formula of $Li_{3-x}M_xN$, where M is one of Co, Cu, and Ni and where x is from about 0.01 to about 0.6;
   a compound having a formula of $Li_{2x-1}MN_x$, where M is one of Mn, Fe, and V and where x is from about 1 to about 4; and
   a compound having a formula of $Li_xMVO_4$, where M is one of Zn, Co, Ni, or Cd and where x is from about 1 to about 8; and
   an electrolyte in communication with the anode, the cathode, and the lithium donor.

2. The Li-ion battery of claim 1, wherein the lithium donor is formed from a compound having a formula of $Li_{3-x}M_xN$, where M is one of Co, Cu, and Ni and where x is from about 0.01 to about 0.6.

3. The Li-ion battery of claim 2, wherein the lithium donor is formed from $Li_{3-x}Co_xN$ where x is from about 0.01 to about 0.5.

4. The Li-ion battery of claim 2, wherein the lithium donor is formed from $Li_{3-x}Cu_xN$ where x is from about 0.01 to about 0.3.

5. The Li-ion battery of claim 2, wherein the lithium donor is formed from $Li_{3-x}Ni_xN$ where x is from about 0.01 to about 0.6.

6. The Li-ion battery of claim 1, wherein the lithium donor is formed from a compound having a formula of $Li_{2x-1}MN_x$, where M is one of Mn, Fe, and V and where x is from about 1 to about 4.

7. The Li-ion battery of claim 6, wherein the lithium donor is formed from $Li_{2x-1}MnN_x$ where x is about 4.

8. The Li-ion battery of claim 6, wherein the lithium donor is formed from $Li_{2x-1}FeN_x$ where x is about 2.

9. The Li-ion battery of claim 6, wherein the lithium donor is formed from $Li_{2x-1}VN_x$ where x is about 1.

10. The Li-ion battery of claim 1, wherein the lithium donor is formed from one of a compound having a formula of $Li_xMVO_4$, where M is one of Zn, Co, Ni, or Cd and where x is from about 1 to about 8.

11. A method of forming a Li-ion battery comprising the steps of:
mixing a powdered Li-containing material with a non-aqueous liquid to form a slurry, the Li-containing material formed from one of a compound having a formula of $Li_{3-x}M_xN$ (where M is one of Co, Cu, and Ni and where x is from about 0.01 to about 0.6), $Li_{2x-1}MN_x$ (where M is one of Mn, Fe, and V and where x is from about 1 to about 4), $Li_xMVO_4$ (where M is one of Zn, Co, Ni, or Cd and where x is from about 1 to about 8);
coating the slurry on a side of a separator of a Li-ion battery; and
drying the slurry coated on the side of the separator to form a lithium donor.

12. The method of claim 11, wherein the coating step involves coating the slurry on the side of the separator adjacent the anode.

13. The method of claim 11, wherein the coating step involves coating the slurry of the side of the separator adjacent the cathode.

14. The method of claim 12, further comprising a step of mixing the powdered Li-containing material with a powdered anode active material prior to the mixing step to form the slurry, wherein the slurry includes the Li-containing material, the anode active material, and the non-aqueous liquid.

15. The method of claim 13, wherein the coating step involves coating the slurry on the current collector to form the anode of the Li-ion battery with the lithium donor incorporated therein.

16. The method of claim 12, further comprising the steps of:
a. mixing the powdered Li-containing material with a powdered cathode material prior to the mixing step to form the slurry, wherein the slurry includes the Li-containing material, the cathode active material, and the non-aqueous liquid; and
b. coating step involves coating the slurry on the current collector to form the cathode of the Li-ion battery with the lithium donor incorporated therein.

* * * * *